No. 830,055. PATENTED SEPT. 4, 1906.
E. A. DOTY.
NUT LOCK.
APPLICATION FILED DEC. 18, 1905.

Witnesses
Dudley C. Ward
Lottie Prior

Inventor
Edwin A. Doty by Ward & Cameron
Attys.

UNITED STATES PATENT OFFICE.

EDWIN A. DOTY, OF ALBANY, NEW YORK.

NUT-LOCK.

No. 830,055.

Specification of Letters Patent.

Patented Sept. 4, 1906.

Application filed December 18, 1905. Serial No. 292,161.

*To all whom it may concern:*

Be it known that I, EDWIN A. DOTY, a citizen of the United States, residing at the city of Albany, in the county of Albany and State of New York, have invented certain new and useful Improvements in Nut-Locks, of which the following is a specification.

My invention relates to lock-nuts; and the object of my invention is to produce a cheap, simple, and effective device by which a nut may be securely locked upon a bolt.

I accomplish this object by means of mechanism illustrated in the accompanying drawings, in which—

Figure 1:
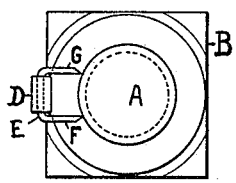
Figure 4:
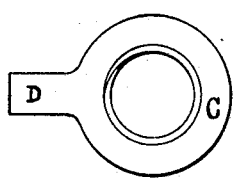
Figure 3:
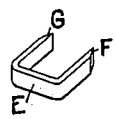
Figure 2:
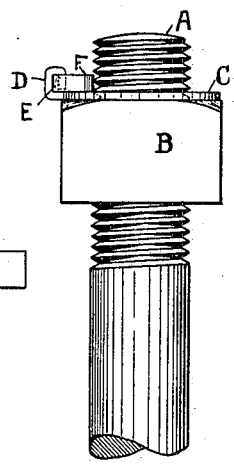
Figure 5:
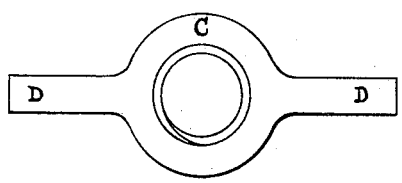

Figure 1 is a top plan view of a bolt with a nut locked upon it by my device. Fig. 2 is a side elevation of the same. Fig. 3 is a perspective view of the catch or dog. Fig. 4 is a plan view of the thin washer-like nut by which the dog or catch is held in contact with the bolt. Fig. 5 is a plan view of a modified form of such locking-nut.

Similar letters refer to similar parts throughout the several views.

A is an ordinary bolt, with screw-threads cut thereon. B is a nut with screw-threads adapted to mesh with the screw-threads of the bolt.

C is a thin washer-like screw locking-nut, preferably made of a soft metal and designed to screw upon the bolt and lie flat upon the nut after the nut has been turned into place. The locking-nut C has one or more elongated arms D, extending from the sides.

E is a dog or catch, somewhat in the form of a double-pointed tack, with the two ends beveled and made into sharp edges or points F and G. The catch E is attached to the locking-nut C by bending the elongated arm D around the shoulder of the catch, as shown in Figs. 1 and 2. The catch E is preferably made of hardened steel and the ends F and G sharpened, as above stated. When the catch E is attached to the arm D, the arms of the catch do not lie flat down upon the locking-nut, but are turned upward at an angle, so that after the nut has been turned into place the locking-nut with the catch attached may be screwed upon the bolt against the nut without the catch interfering and when the locking-nut has reached the position against the nut then the catch is bent downward, preferably by blows or taps of a hammer, and the sharpened points F and G, driven into close contact with the screw-threads of the bolt and being of sharp hardened steel, may be indented more or less into the screw-threads of the bolt. The points F and G being each out of the center, one on each side of the center of the bolt, it is evident that the locking-nut C cannot be turned in either direction and that the nut will be held securely and firmly in its position. When desired, the locking-nut C may have two or more arms D and catches E used in locking the nut.

Constructed in this way my nut-lock may be made in any size desirable and of any suitable material. It may be constructed cheaply and used by inexperienced workmen in any place desired and will hold the nut upon the bolt without the possibility of its becoming loose.

What I claim as my invention, and desire to secure by Letters Patent, is—

1. A nut-lock consisting of a locking-nut having an elongated arm, a catch having two points attached to said arm; said points adapted to come in contact with the screw-threads of the bolt on top of the nut one on each side of the center of the bolt, substantially as described and for the purposes set forth.

2. In combination, a bolt, a nut screwed thereon, a locking-nut screwed on said bolt adjoining said nut, an elongated arm attached to said locking-nut and a double-pointed catch attached to said elongated arm adapted to come in contact with the screw-threads of said bolt, substantially as described and for the purposes set forth.

In testimony whereof I have affixed my signature in presence of two witnesses.

EDWIN A. DOTY.

Witnesses:
 WALTER E. WARD,
 LUCIA C. DAMARELL.